(12) United States Patent
Brown et al.

(10) Patent No.: US 6,377,922 B2
(45) Date of Patent: *Apr. 23, 2002

(54) DISTRIBUTED RECOGNITION SYSTEM HAVING MULTIPLE PROMPT-SPECIFIC AND RESPONSE-SPECIFIC SPEECH RECOGNIZERS

(75) Inventors: Deborah W. Brown, Manalapan; Randy G. Goldberg, Holmdel; Richard R. Rosinski, Middletown; William R. Wetzel, Little Silver, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,582

(22) Filed: Dec. 29, 1998

(51) Int. Cl.[7] .............................................. G10L 15/28
(52) U.S. Cl. ..................................... 704/251; 379/88.01
(58) Field of Search ................................ 704/231, 251; 379/88.01, 88.02

(56) References Cited

U.S. PATENT DOCUMENTS

| | | | | |
|---|---|---|---|---|
| 4,896,346 A | * | 1/1990 | Belfield et al. | 379/88.02 |
| 5,241,619 A | * | 8/1993 | Schwartz | 704/200 |
| 5,553,119 A | * | 9/1996 | McAllister et al. | 379/88.01 |
| 5,787,455 A | * | 7/1998 | Seybold | 711/100 |
| 5,799,065 A | * | 8/1998 | Junqua et al. | 379/88.02 |
| 5,915,001 A | * | 6/1999 | Uppaluru | 379/88.22 |
| 5,970,446 A | * | 10/1999 | Goldberg et al. | 704/233 |
| 6,061,654 A | * | 5/2000 | Brown et al. | 704/275 |

OTHER PUBLICATIONS

Barry, Timothy P., Kristen K. Liggett, David T. Williamson, and John M. Reising, "Enhanced Recognition with the simultaneous use of Three Automated Speech Recognition Systems," Proc. Human Factors Society 36th Ann. Mtg., 1992, pp. 288–292.*

* cited by examiner

Primary Examiner—William Korzuch
Assistant Examiner—Donald L. Storm
(74) Attorney, Agent, or Firm—Kenyon & Kenyon

(57) ABSTRACT

A speech recognition system recognizes spoken utterances received as a speech signal from a user. A prompt for requesting a spoken utterance from the user is assigned a response identifier which indicates at least one of a plurality of speech recognizers to best recognize a particular type of spoken utterance. The system includes a processor for receiving the speech signal from the user in response to the prompt. The processor also directs the speech signal to the at least one speech recognizer indicated by the response identifier. The speech recognizer generates a plurality of spoken utterance choices from the speech signal and a probability associated with each of the plurality of choices. At least one of the spoken utterance choices is selected based on the associated probabilities.

11 Claims, 2 Drawing Sheets

DISTRIBUTED RECOGNITION SYSTEM HAVING MULTIPLE PROMPT-SPECIFIC AND RESPONSE-SPECIFIC SPEECH RECOGNIZERS

FIELD OF THE INVENTION

The present invention is directed to a speech recognition system. More particularly, the present invention is directed to a speech recognition system that uses multiple speech recognizers to increase its accuracy.

BACKGROUND OF THE INVENTION

Speech recognition systems are increasingly being used to translate human spoken words or utterances into their written equivalent and meaning. Speech recognition systems can avoid the need for spoken utterances to be manually entered into a computer, or to be recognized by a human. Therefore, speech recognition systems are desirable for many businesses because these systems can minimize the number of human operators needed to handle calls from customers.

One drawback to speech recognition systems however, is that they can provide inaccurate results. An exact correspondence between the spoken utterance and an output recognized by a speech recognizer is difficult to attain due to, for example, the deterioration of speech signals that routinely occurs over conventional telephone lines and algorithmic limitations. Such deterioration present in the speech signals may cause a speech recognizer to produce a recognized output that does not correspond to the spoken utterance. Because of limitations introduced into the speech signal by the telephone lines, the speech recognizer may confuse similar sounding letters and numbers. Thus, a speech recognizer may confuse the letter "B" with the number "3" or the letter "C". For example, given that a user utters the numbers "123" into a telephone, the speech recognizer may produce "12B" as the output.

Additionally, various speech recognizers have their own strengths and weaknesses with respect to accurately identifying spoken utterances. For example, one speech recognizer may perform better at recognizing a sequence of alpha-numeric characters while other speech recognizers perform better at recognizing proper nouns such as for examples, names of places, people and things. Also, some speech recognizers can execute certain tasks faster or require less processing time than other speech recognizers.

If such speech recognition systems are utilized, it is important that the speaker communicate accurate information to the system with maximum machine assistance and minimum user intervention. For example, it is desirable that the user be prompted as few times as possible to repeat questionable information or to supply additional information for the speech recognition system to reach the correct result.

Based on the foregoing there is a need for a speech recognition system that has an increased recognition accuracy without the necessity of relying on human operator intervention or requiring additional input from the user.

SUMMARY OF THE INVENTION

One embodiment of the present invention is a speech recognition system for recognizing spoken utterances received as a speech signal from a user. A prompt for requesting a spoken utterance from the user is assigned a response identifier which indicates at least one of a plurality of speech recognizers to best recognize a particular type of spoken utterance. The system includes a processor for receiving the speech signal from the user in response to the prompt. The processor also directs the speech signal to the at least one speech recognizer indicated by the response identifier. The speech recognizer generates a plurality of spoken utterance choices from the speech signal and a probability associated with each of the plurality of choices. At least one of the spoken utterance choices is selected based on the associated probabilities.

DETAILED DESCRIPTION

Figure 1:
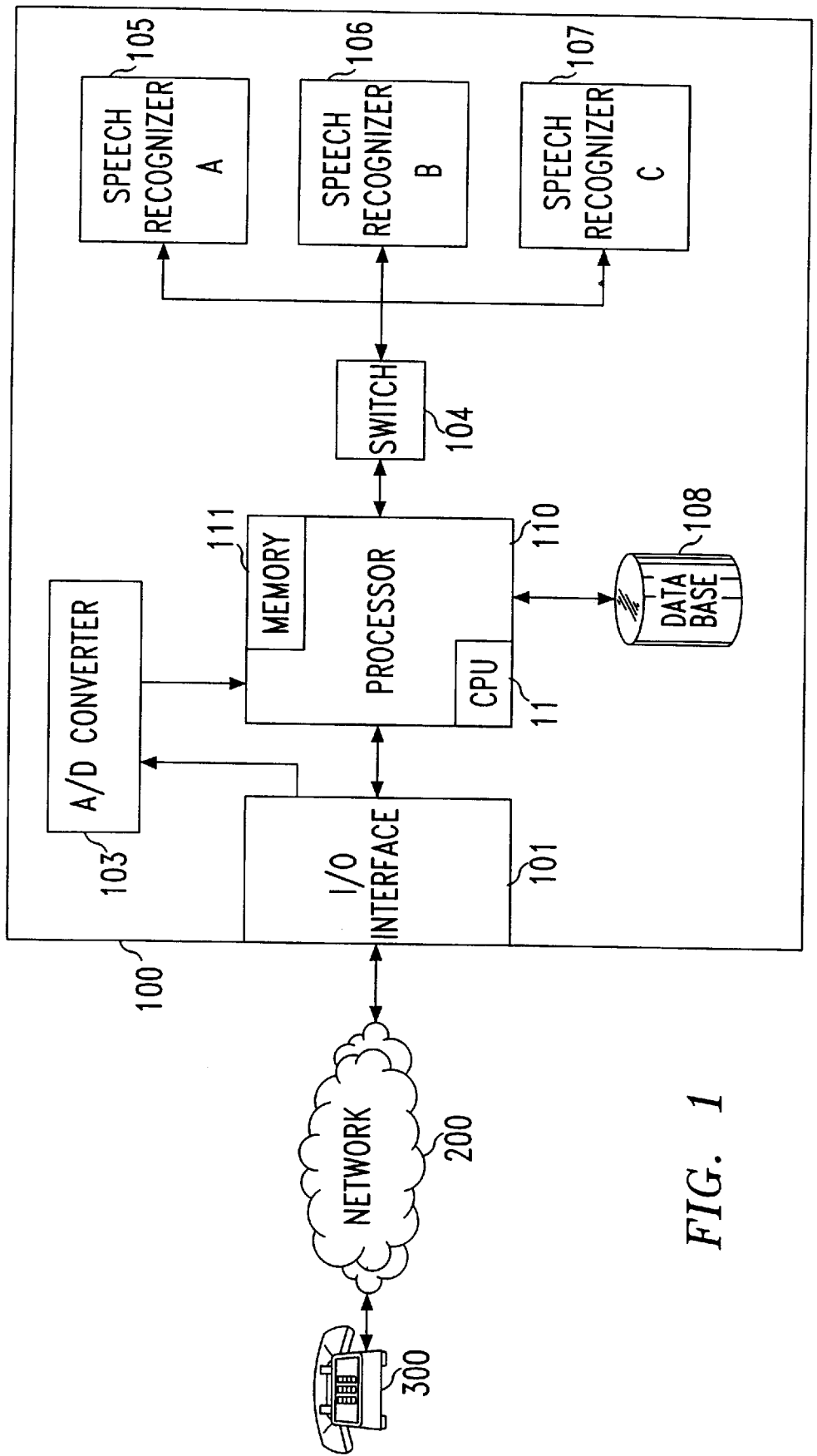
FIG. 1 is a block diagram illustrating a speech recognition system in accordance with one embodiment of the present invention.

One embodiment of the present invention is a speech recognition system that uses multiple speech recognizers to enhance its recognition accuracy. FIG. 1 is a block diagram illustrating a speech recognition system 100 in accordance with one embodiment of the present invention. Speech recognition system 100 includes an input/output (I/O) interface 101. I/O interface 101 interfaces system 100 to a user. I/O interface 101 can be a remote interface, such as a telephone line connection as shown in FIG. 1. I/O interface can also be a local interface, for example, a microphone and a speaker.

In the embodiment shown in FIG. 1, I/O interface 101 is coupled through a network 200 to a telephone 300. Telephone 300 enables a user of speech recognition system 100 to access the system by participating in a telephone call between telephone 300 and system 100. The user can transmit a speech signal to system 100 through telephone 300 as well as receive signals from system 100. Network 200 can be any network that enables the user at telephone 300 to dial a telephone number associated with system 100. For example, network 200 can be the Public Switched Telephone Network ("PSTN"), a local area network, the Internet, or an intranet.

Speech recognition system 100 also includes an analog-to-digital ("A/D") converter 103 coupled to I/O interface 101 and a processor 110. A/D converter 103 converts analog speech signals from spoken utterances received from I/O interface 101 into digital signals. Alternatively, a digital signal may be sent through a digital network. An example is where A/D converter 103 is located locally. These digital signals are then received by processor 110. Processor 110 includes a memory 111 and a central processing unit (CPU) 11 that executes a supervisory operating system to coordinate the interactions between some of the different system elements. CPU 11 also executes application software in response to information supplied by the user.

Memory 111 may be a combination of random access memory (RAM), read only memory (ROM) and/or erasable programmable read only memory (EPROM) components. One or more system components may directly access memory 111, without the use of processor 110. In addition, one or more of the system components may incorporate its own local memory.

Speech recognition system 100 further includes a recognizer switch 104, a data storage device 108 and speech recognizers A, B and C, labeled 105, 106 and 107, respectively. Each speech recognizer includes speech processing software and hardware that receives a speech signal generated from a human utterance and generates one or more choice of words that represent the utterance. For each choice of words, a probability that the choice of words is the correct choice may also be generated by the speech recognizers. As illustrated, three speech recognizers are shown, but many such recognizers can be included in system 100. Database 108 stores prerecorded prompts used to communicate with the user by soliciting responses from the user. For example, database 108 may store prompts which request a user's account number or requests a method of payment for a particular transaction.

In one embodiment of the present invention, the speech recognizers utilize a Hidden Markov Model to generate a list of "N-best" choices for the solicited response. An example of this method of speech recognition is disclosed in U.S. Pat. No. 5,241,619, herein incorporated by reference. In another embodiment, each speech recognizer executes post-processing routines to generate multiple choices and associated probabilities for each choice. Further, other known methods can be used by the speech recognizers to generate multiple choices and probabilities assigned to these choices. Speech recognizers 105–107 preferably have different capabilities or effectiveness in handling specific recognition situations. That is, the recognizers may provide varying degrees of reliability under different circumstances. For example, one speech recognizer may provide the most reliable recognition of numbers or digits, another may provide high reliability for recognition of letters of the alphabet, still another may provide high reliability in a specific limited vocabulary. These capabilities may be determined by testing each of the recognizers before implementation into recognition system 100. This testing process may include supplying each speech recognizer with an identical spoken utterance. A plurality of these identical spoken utterances may be supplied to each speech recognizer. The plurality of identical spoken utterances includes may types of spoken utterances such as digits, letters of the alphabet, limited vocabulary, etc. Each recognizer then processes the spoken utterances and returns an output signal. The output signals of the speech recognizers are compared with correct signals which represents the spoken utterances to determine which speech recognizer or speech recognizers correctly recognized the spoken utterances. After employing multiple types of spoken utterances such as digits, letters of the alphabet, limited vocabulary, etc., the recognizer that provides the highest reliability for recognizing a particular type of spoken utterance is assigned to recognize that particular type of spoken utterance. Additionally, there are other factors taken into consideration when assigning a speech recognizers to recognize a particular type of spoken utterance. These factors may include the cost associated with a speech recognizer recognizing a particular type of spoken utterance and the speed at which the speech recognizer can recognize the particular type of spoken utterance. According to an embodiment of the present invention, recognizer A may be assigned to recognize digits, recognizer B may be assigned to recognize letters of the alphabet and recognizer C may be assigned to recognize limited vocabulary.

In continuing with the description of an embodiment of the present invention, processor 110 is programmed to select from a plurality of prompts stored in database 108. A prompt can be in the form of recorded or computer generated voice or in the form of a textual prompt if the customer has a local display that is connected to speech recognition system 100. The selected prompt is presented to the user to obtain a spoken utterance. Associated with each prompt is a response identifier which indicates the speech recognizer to be used for recognizing the spoken utterance. If a spoken utterance is supplied by the user, processor 110 along with switch 104 directs the response to the speech recognizer indicated by the response identifier. According to the present invention, a response identifier can indicate more than one speech recognizer if it is anticipated that the spoken utterance will contain multiple types of input utterances.

Each spoken utterance from the user initiates the next prompt in a flexible schedule of prompts to retrieve user information. For the purpose of this application the flexible schedule of prompts for recognition system 100 is implemented in an airline reservation and information system in a manner now described.

A user dialing a predetermined number associated with the airline reservation and information system is connected to system 100 via network 200. Processor 110 instructs the user with a stored prompt from database 108 requesting the user to speak his account number. For example, in the airline reservation embodiment, the prompt could be "What is your account number?" The account number can consist of all numbers or a combination of alpha-numeric characters. Associated with the stored prompt is the response identifier. The response identifier assigns at least one speech recognizer to a stored prompt in anticipation of the spoken utterance. Therefore, if system 100 anticipates receiving an alpha-numeric character as the spoken utterance for the user's account number, the response parameter will assign speech recognizer A to recognize digits and speech recognizer B to recognize letters of the alphabet.

Once the user supplies recognition system 100 with a spoken utterance in response to the request for his account number, a speech signal is generated in response to the user's utterance. Processor 110 processes the speech signal and forwards the user's response to the speech recognizer associated with the response identifier. The assigned speech recognizer decodes the received speech signal. In one embodiment, the assigned speech recognizer utilizes a Hidden Markov Model to generate one word choice or to generate a list of "N-best" choices. A probability for each word choice that that word choice is the correct word choice can also be generated. In another embodiment, the assigned speech recognizer generates one word choice, and then optionally executes post-processing routines to generate multiple choices and associated probabilities for each choice. Further, other known methods can be used by the assigned speech recognizer to generate one word choice or multiple word choices from the received speech signal.

In the case where multiple speech recognizers have been assigned, each speech recognizer provides a word choice and an assigned probability. These probabilities can be compared to determine which is higher, thus indicating the recognizer that best recognized the user's utterance. In another embodiment, an output signal from each recognizer is supplied to a comparator. The comparator compares the output signals to determine if a match between the output signals occurs. If a match occurs, the matched output signal is used to generate a word choice. Alternatively, if a match does not occur, each output signal is used to generate a different word choice with an assigned probability.

After the word choices and the probabilities have been assigned, one of the word choices is then selected using known methods of selecting the word choice with the highest probability. Once a word choice is selected, known methods can be used to confirm that the selected word choice is the correct word choice. For example, using another stored prompt from database 108, system 100 can ask the user "Is this your correct account number? Say Yes or No." The response from the user will confirm if the selected word choice was correct.

Alternatively, a predetermined probability threshold could be used to filter out word choices falling below a predetermined probability value. In this case, each word choice having an assigned probability below the predetermined probability value would be discarded and only word choices above the predetermined probability threshold would be presented to the user for verification.

In response to a verified spoken utterance, speech recognition system 100 could further request, "Which airport do you wish to depart from?" Associated with this prompt is the response identifier assigning speech recognizer C which most accurately recognizes words in a limited vocabulary. For the purpose to the airline reservation and information system example of the present invention, a list of all the names of the airports would be stored by speech recognizer C. Table 1 below is an example of stored prompts and associated response identifier according to the present invention.

TABLE 1

| Stored Prompts | Response Identifier |
| --- | --- |
| What is your account number? | Recognizer A & Recognizer B |
| Which airport do you wish to depart from? | Recognizer C |
| What is your telephone number? | Recognizer A |
| Is this information correct? Say Yes or No. | Recognizer C |
| Please spell your last name. | Recognizer B |

Figure 2:
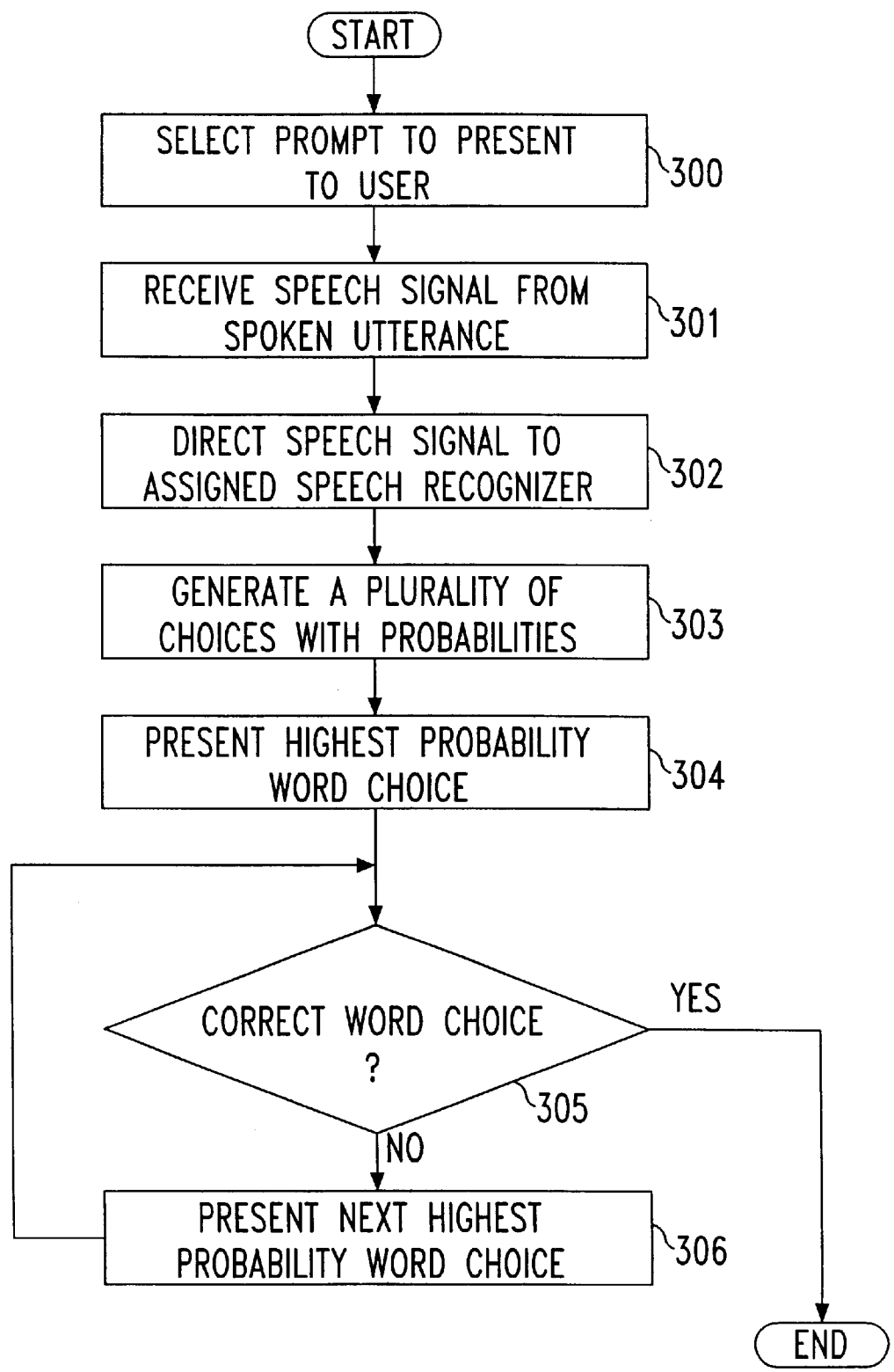
FIG. 2 is a flowchart illustrating the steps performed by a speech recognition system in accordance with one embodiment of the present invention.

FIG. 2 is a flowchart illustrating some of the steps performed by one embodiment of speech recognition system 100 when a user dials the telephone number associated with speech recognition system 100 from telephone 300. The call is connected to network 200 or to other call processing hardware in the manner previously described.

At step 300, processor 110 selects a prompt stored in database 108 to present to the user. Associated with the stored prompt is a response identifier. The response identifier assigns at least one speech recognizer which performs best at recognizing a particular type of human utterance. In step 300, the prompt is a request for the user's account number.

At step 301, processor 110 receives a speech signal generated by the user's utterance in response to the request for the user's account number. For example, the user's account number "CBA123" will be spoken by the user if this is the account number assigned to the user.

At step 302, speech recognizer A and speech recognizer B receive the speech signal representing "CBA123" from processor 100. At step 303, each speech recognizer generates a plurality of choices of possible user account numbers based on the received speech signal. These choices are generated using the speech recognition hardware and software previously discussed. Associated with each choice is a probability as to whether that choice is the correct account number. Table 2 below is an example of some of the choices and associated probabilities that might be generated in response to the user's utterance of "CBA123". The list of choices in Table 2 can include the choices for both recognizer A and recognizer B or a separate list of choices and assigned probabilities can be created for each recognizer.

TABLE 2

| Account Number | Probabilities |
| --- | --- |
| CBA123 | .01 |
| ZBA123 | .003 |
| BBA023 | .006 |
| GCK123 | .005 |

At step 304, the user account number with the highest probability is presented to the user (e.g., "CBA123" in the example of Table 2). In addition, the user may be asked whether the presented user account number is the correct account number. For example, a prompt with a response identifier assigning Recognizer C, can request the user to verify that "CBA123" is the correct account number by asking the user, "Is your account number CBA123? Say Yes or NO."

At step 305, based on the response from the user at step 304, processor 110 determines whether the presented user account number is the correct account number. If it is, then speech recognition system 100 has successfully recognized the correct user account number.

However, if it is not the correct account number, at step 306, the account number with the next highest probability (i.e., "ZBA123" in the example of Table 2) maybe presented to the user. Steps 305 and 306 are repeated until the correct account number is successfully recognized.

As disclosed, the present invention utilizes multiple speech recognizers to increase the accuracy of spoken utterances from a user. A prompt, used to solicit a response from a user in the form of a spoken utterance, is assigned to a speech recognizer designed to best recognize a particular type of spoken utterance. Thus, this allows speech recognition to proceed more quickly and accurately and with less disruption to the user. Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for recognizing a user's utterance in response to one or more prompts, comprising:

assigning a plurality of speech recognizers to each of the prompts, the plurality of recognizers being trained to recognize a specific set of speech context expected for each of the prompts;

prompting a user using one or more prompts;

receiving the user's utterance;

recognizing the user's utterance using each of the plurality of recognizers assigned to the prompt;

simultaneously generating an output representing the user's utterance using each of the plurality of recognizers;

applying measurement criteria to each generated output of the plurality of recognizers;

selecting a best recognized output from the generated outputs of each of the plurality of recognizers based on the applied measurement criteria; and outputting the best recognized output for processing.

2. The method of claim 1, wherein the applying step comprising:

calculating a probability value associated with each generated output of the plurality of recognizers, the associated probability value indicating the probability that the output correctly represents the user's utterance.

3. The method of claim 2, wherein the selecting step comprising:

selecting the output from the generated outputs that has a highest calculated probability value associated with it.

4. The method of claim 2, further comprising:

establishing a pre-determined probability threshold, the pre-determined threshold containing a minimum probability value;

comparing each calculated probability value associated with each generated output with the pre-determined probability threshold; and presenting any generated output having its associated probability value greater than the minimum probability value to the user for confirmation.

5. The method of claim 4, further comprising:

discarding any generated output having its associated probability value below the minimum probability value.

6. The method of claim 1, wherein the selecting step comprising:

presenting each of the generated outputs of the plurality of recognizers to the user for confirmation.

7. A speech recognition system comprising:

a plurality of speech recognizers assigned to a prompt, the plurality of recognizers being trained to recognize a specific set of speech context expected for the prompt;

an output interface that presents the prompt to a user;

an input interface that receives an utterance from the user responsive to the presented prompt, wherein each of the plurality of speech recognizers simultaneously generates an output representing the user's utterance; and a processor that applies measurement criteria to each generated output and selects a best recognized output from the generated outputs based on the applied measurement criteria, wherein the output interface outputs the selected best recognized output for processing.

8. The speech recognition system of claim 7, wherein the processor further calculates a probability value associated with each generated output and selects the output that has a highest calculated probability value associated with it.

9. The speech recognition system of claim 8, further comprising:

an analog-to-digital converter that converts the user's utterance into digital signals that are sent to the plurality of speech recognizers.

10. The speech recognition system of claim 7, wherein the plurality of speech recognizers include two speech recognizers.

11. The speech recognition system of claim 7, wherein the plurality of speech recognizers include three speech recognizers.

* * * * *